United States Patent
Kim et al.

(10) Patent No.: US 10,910,697 B2
(45) Date of Patent: Feb. 2, 2021

(54) MOBILE TERMINAL

(71) Applicant: LG ELECTRONICS INC., Seoul (KR)

(72) Inventors: Dongjin Kim, Seoul (KR); Kangjae Jung, Seoul (KR); Duckyun Kim, Seoul (KR); Changwon Yun, Seoul (KR); Soyeon Lee, Seoul (KR); Songyi Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/479,072

(22) PCT Filed: Jan. 26, 2017

(86) PCT No.: PCT/KR2017/000942
§ 371 (c)(1),
(2) Date: Jul. 18, 2019

(87) PCT Pub. No.: WO2018/139691
PCT Pub. Date: Aug. 2, 2018

(65) Prior Publication Data
US 2020/0014093 A1    Jan. 9, 2020

(51) Int. Cl.
*H01Q 1/24* (2006.01)
*H01Q 1/52* (2006.01)
*H01Q 1/48* (2006.01)

(52) U.S. Cl.
CPC ............ *H01Q 1/243* (2013.01); *H01Q 1/521* (2013.01); *H01Q 1/48* (2013.01)

(58) Field of Classification Search
CPC .......... H01Q 1/243; H01Q 1/48; H01Q 1/521; H01Q 9/40; H01Q 5/30; H01Q 1/52; H01Q 3/00; H01Q 1/02
See application file for complete search history.

(56) References Cited

U.S. PATENT DOCUMENTS

| 10,651,556 | B2 * | 5/2020 | Nishikawa ............. H01Q 5/385 |
| 2012/0287010 | A1 | 11/2012 | Soekawa |
| 2016/0226133 | A1 | 8/2016 | Jung et al. |

(Continued)

FOREIGN PATENT DOCUMENTS

| CN | 1446389 A | 10/2003 |
| CN | 1588894 A | 3/2005 |

(Continued)

*Primary Examiner* — Jimmy T Vu
(74) *Attorney, Agent, or Firm* — Birch, Stewart, Kolasch & Birch, LLP

(57) ABSTRACT

A mobile terminal, which comprises: a case including an electric component mounting part therein; a middle frame mounted on the case; a main board mounted on the case; a first antenna spaced apart from and arranged in parallel to the middle frame, and having a first end that is open and a second end connected to the middle frame; a first feed line connected to a first part of the first antenna so as to transmit a signal; a ground line connected to a second part of the first antenna and performing grounding; a second antenna connected to the ground line; and a second feed line connected to the second antenna, increases the number of Wi-Fi antennas, thereby enabling data transmission speed to become faster.

10 Claims, 8 Drawing Sheets

(a)

(b)

(56) References Cited

U.S. PATENT DOCUMENTS

2016/0254589 A1* 9/2016 Ju .................. H01Q 1/2208
  343/702
2016/0277062 A1  9/2016 Cheon et al.

FOREIGN PATENT DOCUMENTS

| | | |
|---|---|---|
| CN | 102509881 A | 6/2012 |
| CN | 103441330 A | 12/2013 |
| CN | 104425885 A | 3/2015 |
| CN | 105305072 A | 2/2016 |
| CN | 105958201 A | 9/2016 |
| EP | 3086403 A1 | 10/2016 |
| EP | 3098902 A1 | 11/2016 |
| JP | 6033693 B2 | 11/2016 |
| KR | 10-2014-0097849 A | 8/2014 |
| KR | 10-1622731 B1 | 5/2016 |
| KR | 10-2016-0067541 A | 6/2016 |
| KR | 10-1640709 B1 | 7/2016 |
| KR | 10-2016-0139175 A | 12/2016 |

* cited by examiner (a)

(b)

(a)

(b)

(a)

(b)

ial Application No. PCT/KR2017/000942, filed on Jan. 26, 2017, of which is hereby expressly incorporated by reference into the present application.

TECHNICAL FIELD

The present disclosure relates to a mobile terminal having a structure capable of ensuring antenna performance even when a bezel size is reduced.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As the functions of such terminals are expanded, various types of wireless communication are applied such that data is exchanged in a wireless manner. In order to utilize various wireless communication schemes, antennas having different frequency characteristics are configured. In order to transmit and receive more data, a plurality of antennas operating in one frequency band may be configured to transmit or receive data simultaneously or sequentially.

However, there is a problem that wireless communication is influenced by surrounding electronic components and thus mutual interference occurs. For this reason, a distance from the antenna to other components and the distance and arrangement between the antennas are being studied.

DISCLOSURE

Technical Purpose

The present disclosure aims to provide a mobile terminal having antennas in which interferences between the plurality of antennas may be minimized.

Technical Solution

In a first aspect of the present disclosure, there is provided a mobile terminal comprising: a case for receiving an electronic component therein; a middle frame mounted on the case; a main board mounted on the case; a first antenna spaced apart from and parallel with the middle frame, wherein the first antenna has an open first end and a second end connected to the middle frame; a first feeding line connected to the first antenna to transmit a signal thereto; a ground line connected to the first antenna to ground the first antenna; a second antenna connected to the ground line; and a second feeding line connected to the second antenna.

In one implementation of the first aspect, the second antenna includes: a first pattern connected to the ground line; and a second pattern connected to the second feeding line, wherein a gap is defined between the first pattern and the second pattern.

In one implementation of the first aspect, the first antenna extends in a first direction, wherein the first pattern and the second pattern are arranged in the first direction.

In one implementation of the first aspect, the first end of the first antenna and the gap of the second antenna are not overlapped with each other.

In one implementation of the first aspect, the gap of the second antenna extends in a bent shape.

In one implementation of the first aspect, at least a portion of the second antenna is overlapped with a space between the first antenna and the middle frame.

In one implementation of the first aspect, at least a portion of the second antenna is overlapped with the middle frame and is located on a back face of the case.

In one implementation of the first aspect, the case include a side case, wherein the first antenna defines a portion of the side case exposed to an outside.

In one implementation of the first aspect, the case includes a rear case made of nonmetallic material, wherein the second antenna includes a conductive pattern attached to the rear case.

In a second aspect of the present disclosure, there is provided a mobile terminal comprising: a case for receiving an electronic component therein; a middle frame mounted on the case; a main board mounted on the case; a first antenna disposed on one side of the middle frame and parallel with the middle frame, wherein the first antenna has one end connected to the middle frame and the other end being open such that an opened slot is defined between the middle frame and the other end of the other end of the first antenna; and a second antenna having one side overlapped with the slot and the other side overlapped with the middle frame, wherein the second antenna has a gap defined in a portion thereof overlapped with the middle frame.

In one implementation of the second aspect, the mobile terminal further comprises: a first feeding line connected to the first antenna to transmit a signal thereto; a ground line connected to both of the first antenna and the second antenna; and a second feeding line connected to the second antenna to transmit a signal thereto, wherein the gap is located between a location at which the ground line is connected to the second antenna and a location at which the second feeding line is connected to the second antenna.

Technical Effect

According to the present disclosure, the mobile terminal may have the increased number of Wi-Fi antennas to increase the data transmission speed.

Further, it is possible to minimize the interference between the antennas transmitting and receiving the signals at each frequency to improve the antenna performance. Even when the size of the display unit is increased, the antenna performance can be ensured such that the size of the bezel of the top of the display unit can be reduced.

Further, a scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTIONS

Figure 1A:
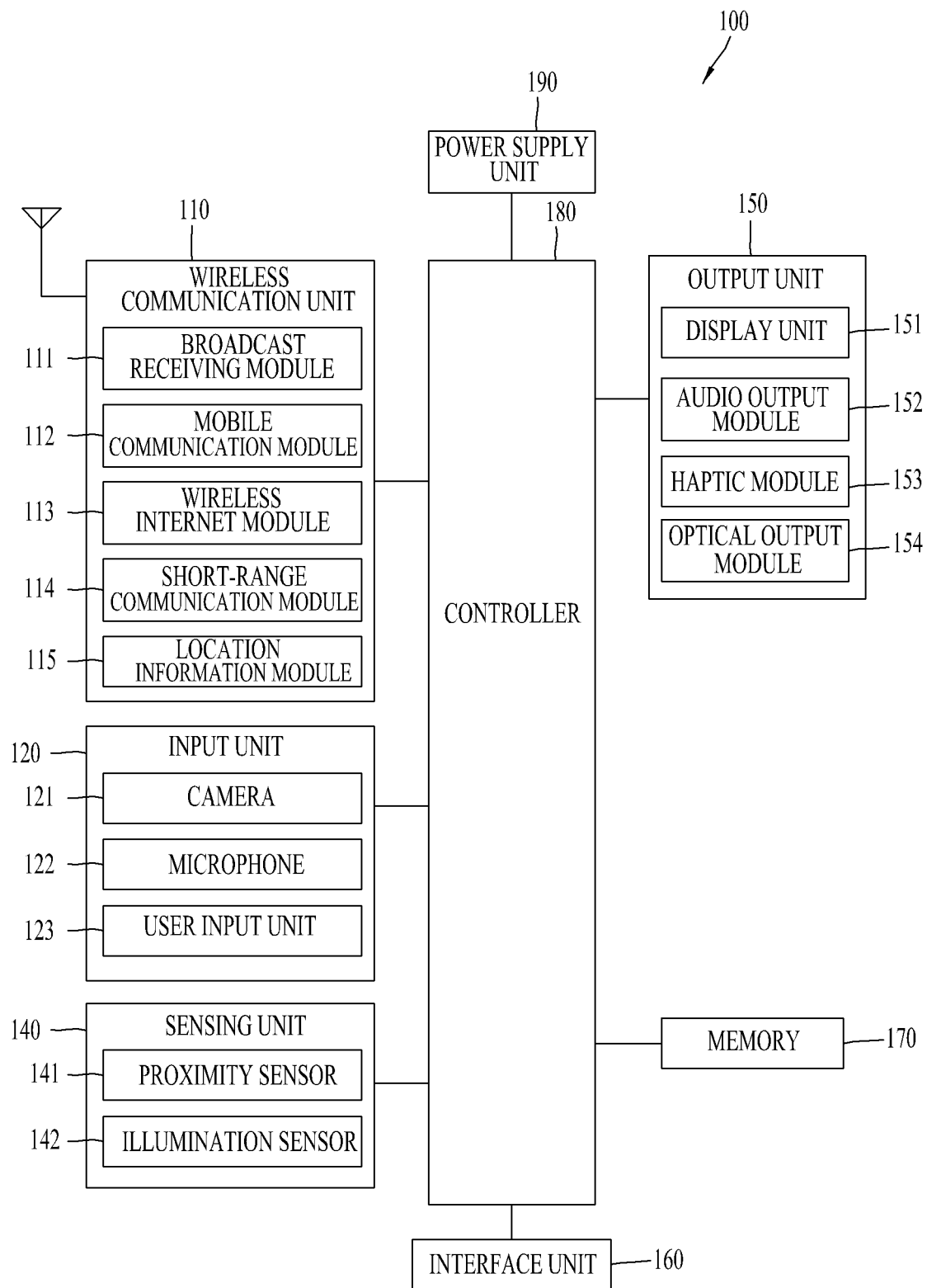
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
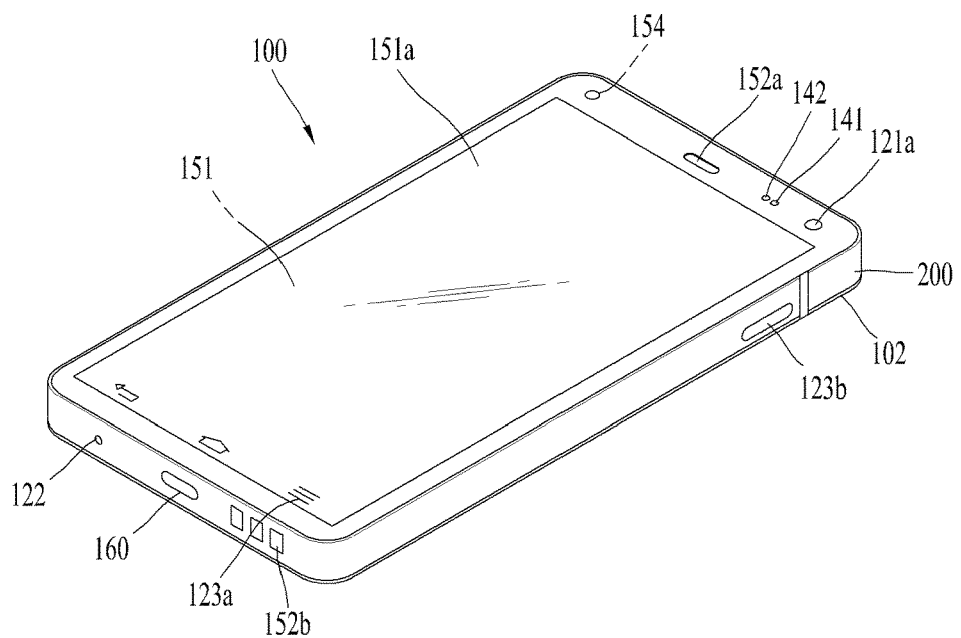
FIGS. 1B and 1C are conceptual views of one example of the mobile terminal, viewed from different directions.
Figure 1C:
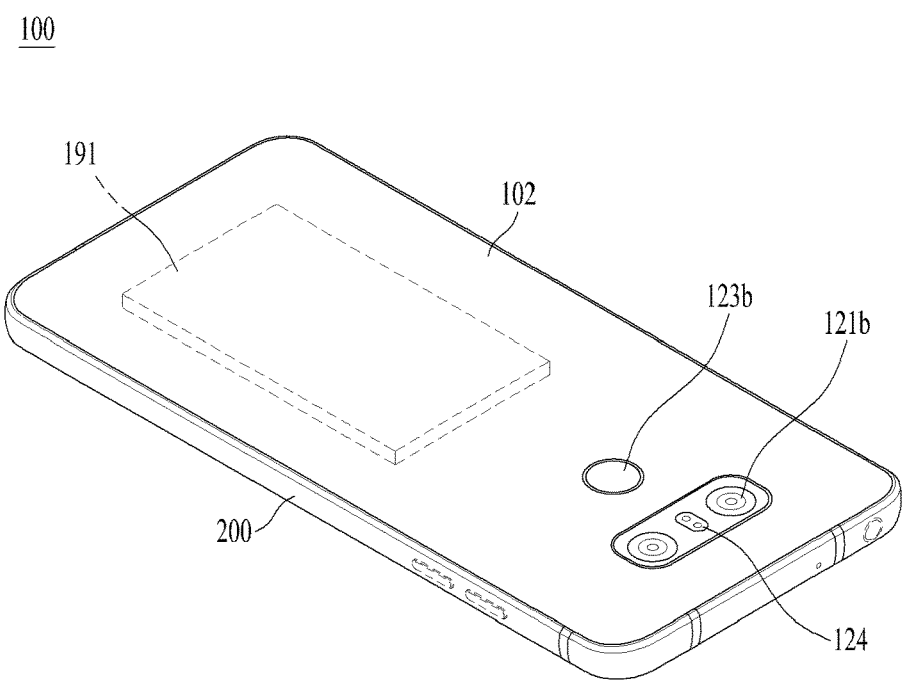

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1A, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal 100 to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

A middle frame 290 (see FIG. 3) may be configured to support the backside of the display unit 151 for rigidity of the mobile terminal 100. The middle frame 290 may include a metallic material for the rigidity. Further, the middle frame may not only provide the rigidity to the mobile terminal and but also serve as a ground with a large-area and made of a conductive material. The middle frame may be connected to each of components for grounding of the electronic components such as antennas.

The middle frame 290 may be configured so as not to be exposed to the outside and may be integrally formed with a front case located on the front surface of the body or a side case 200 located on the side surface thereof.

As the multimedia function is expanded, the size of the display unit 151 is increased and the size of the bezel located around the active region of the display unit 151 is gradually decreasing. In particular, the top portion requires installation spaces for the camera 121, the sound output unit 152, the proximity sensor 141, and the like to be positioned, and physical buttons are disposed on the lower end. This may limit the size expansion of the display unit 151.

However, in recent years, the size of each component is minimized and a user input unit 123 using a soft key is implemented instead of a physical button, so that a soft key is displayed on the screen only when necessary, and if unnecessary, the soft key disappears. Thus, the size of the screen can be increased.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

The cases 101, 102, 103 may be formed by injection-molding synthetic resin or may be formed of a metal, for example, stainless steel (STS), aluminum (Al), titanium (Ti), or the like.

The mobile terminal 100 of the present embodiment includes the side case 200 surrounding a side surface. The side case 200 may include a metal material. However, for wireless communication performance, a portion of the side case may include non-metallic materials. As shown in FIGS. 1B and 1C, the side case 200 includes a plurality of antennas 230 and 240 (see FIG. 2) made of a conductive material such as metal, and nonmetallic slits 203 and 204 (See FIG. 2) arranged between the antennas.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first and second audio output modules 152a and 152b, the proximity sensor 141, the illuminance sensor 142, the optical output module 154, the first and second cameras 121a and 121b, the first and second manipulation units 123a and 123b, the microphone 122 and the interface unit 160.

It will be described for the mobile terminal as shown in FIGS. 1B and 1C. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit 123c may be located on the rear surface of the terminal body. The rear input unit 123c can be manipulated by a user to provide input to the mobile terminal 100. The input may be used in a variety of different ways. For example, the rear input unit 123c may be used by the user to provide an input for power on/off, start, end, scroll, control volume level being output from the first or second audio output modules 152a or 152b, switch to a touch recognition mode of the display unit 151, and the like. The rear input unit 123c may be configured to permit touch input, a push input, or combinations thereof.

The rear input unit 123c may be located to overlap the display unit 151 of the front side in a thickness direction of the terminal body. As one example, the rear input unit 123c may be located on an upper end portion of the rear side of the terminal body such that a user can easily manipulate it using a forefinger when the user grabs the terminal body with one hand. Alternatively, the rear input unit 123c can be positioned at most any location of the rear side of the terminal body.

Embodiments that include the rear input unit 123c may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A). may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments related to a control method that may be implemented in the mobile terminal configured as described above will be described with reference to the accompanying drawings. It will be apparent to those skilled in the art that the present disclosure may be embodied in other specific forms without departing from the spirit or essential characteristics of the present disclosure.

As the multimedia function becomes important, the wireless communication technology performed by the mobile terminal 100 is performed in various forms, for example, in a short-range, long distance or inter-device manner. In this connection, because different frequency bands are used, different antennas should be used.

In recent years, as wireless communication technology has developed, a large amount of data has been transmitted and received. To this end, it is possible to use a multiple input/multiple output (MIMO) technique for simultaneously or sequentially transmitting/receiving signals at the same frequency band. This may increase the number of antennas of the base station and the mobile terminal 100 to two or more antennas to transmit data along a plurality of paths and may detect a signal received along each of the paths by a receiving end to reduce interference therebetween and reduce the transmission rate of each path. In order to apply the MIMO technique, it is necessary to increase the number of antennas within a limited size of the mobile terminal 100.

Because the antenna generates an electromagnetic field, it is affected by adjacent conductive materials. Thus, interference may occur between adjacent antennas, which may cause degradation of radio signal performance. Accordingly, the antennas may be attached to the case to be disposed on the outer side of the mobile terminal 100, or the case itself may be used as an antenna.

As the size of the display unit increases, the size of the left and right bezels of the mobile terminal 100 is almost zero. The side cases on the left and right to the display unit may not function as antennas reliably. For this reason, each of the top and bottom portions of the mobile terminal 100 may act as an antenna.

Figure 2:
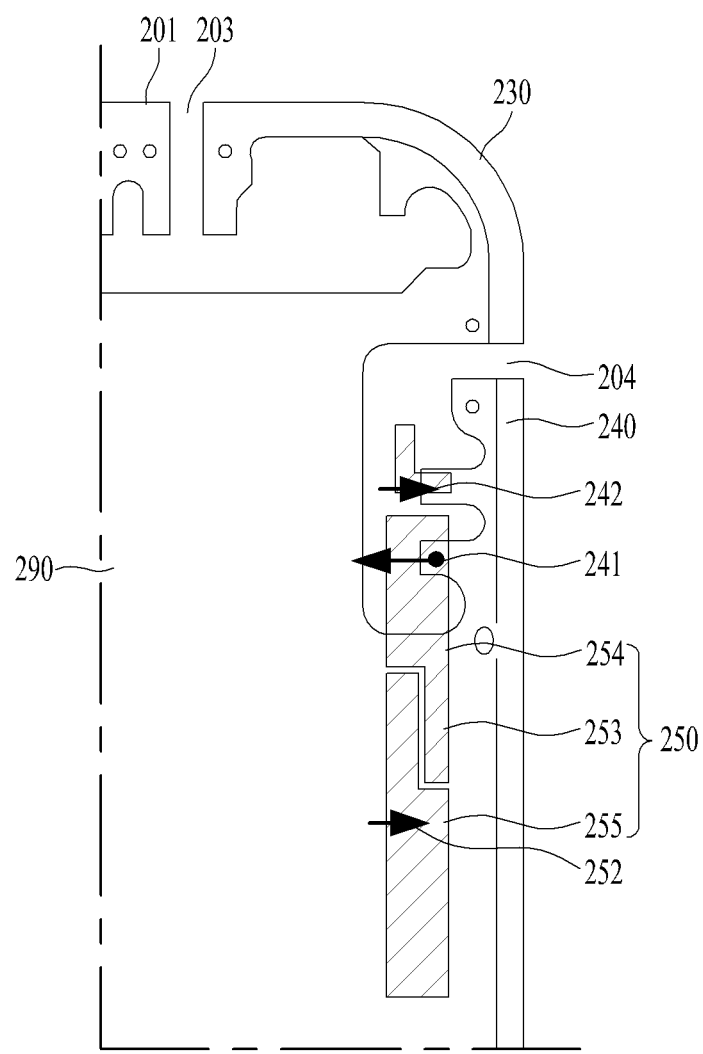
FIG. 2 is a view illustrating an radiator of a mobile terminal according to an embodiment of the present disclosure.

FIG. 2 shows an antenna for short-range wireless communication such as Wi-Fi and Bluetooth among the antennas of the mobile terminal 100 in accordance with the present disclosure. The mobile terminal 100 in accordance with the present disclosure has an antenna for performing Wi-Fi/Bluetooth based wireless communication at the top portion of the mobile terminal 100.

Wi-Fi WIFI stands for Wireless Fidelity. This is a technology called short-range communication network over which the device can access the wireless Internet within a certain distance using the radio wave or infrared transmission scheme in a site where the access point (AP) is installed. The main purpose of Wi-Fi is to allow the user to access information more easily and to allow the user device to coexist with peripheral devices to enhance compatibility therebetween, and to allow wireless access to applications and data, media, and streams. In order to use Wi-Fi, the access point (AP) is required. When the AP is available, a device supporting the Wi-Fi captures the reception radio wave and tries to access the Internet.

According to the IEEE 802.11 standard, signals in the 2.4 GHz and 5 GHz frequency bands are used. The conventional WiFi antenna uses the SISO (serial in serial out scheme), thereby to have a slow transmission rate. However, recently, the data transmission amount has increased exponentially by applying the MIMO technology to the WIFI technology.

Bluetooth uses ISM (Industrial Scientific and Medical) frequency band of 2400 to 2483.5 MHz. The band may be divided into 79 channels to prevent interference between devices. Bluetooth may utilize a frequency band similar to that of WiFi and may perform wireless communication using the same antenna as that of the WiFi.

The present disclosure is characterized in that a Wi-Fi antenna is implemented using two antennas to improve the wireless communication performance based on the Wi-Fi. In this connection, the two antennas may include a first antenna 240 as a portion of the side case and a second antenna 250 sharing a ground line 241 with the first antenna 240 to implement the Wi-Fi antenna.

Referring to FIG. 2, a middle frame 290 and a side case 200 are shown. The middle frame 290 and the side case 200 are spaced apart from each other. In another example, they may be partially and integrally connected to each other.

The side case 200 includes antennas 230 and 240 made of a conductive material such as metal, and slits 203 and 204 spacing the antennas 230 and 240 from each other. Although not shown in FIG. 2, an integrated side case 200 may be produced by injecting a nonconductive material into the slit 203 and 204 between the antennas 230 and 240 in a dual injection scheme, as shown in FIG. 1B and FIG. 1C.

The first antenna 240 located on the side case among the plurality of antennas is an antenna used for wireless communication based on Wi-Fi and Bluetooth. A first end of the first antenna 240 is open, while a second end thereof is connected to the middle frame 290. That is, the middle frame 290 and the first antenna 240 defines a slot whose the first end is opened and the second end is blocked.

Figure 3:
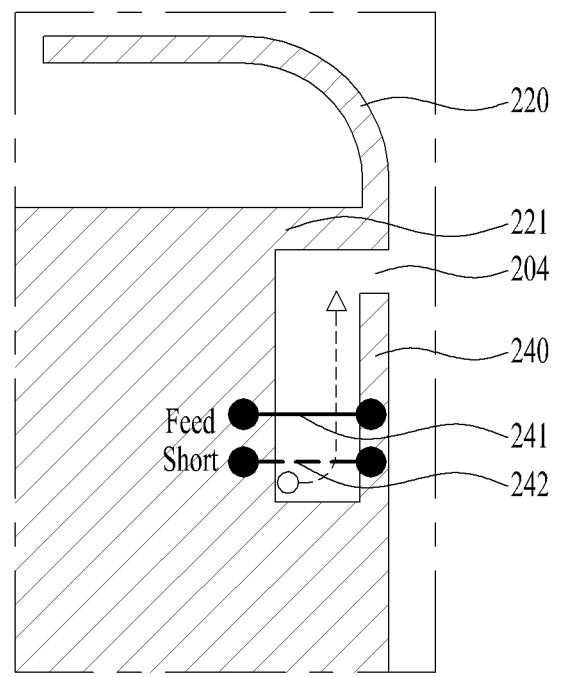
FIG. 3 is a diagram for explaining the operation and performance of a first antenna of a mobile terminal according to an embodiment of the present disclosure.
Figure 3:
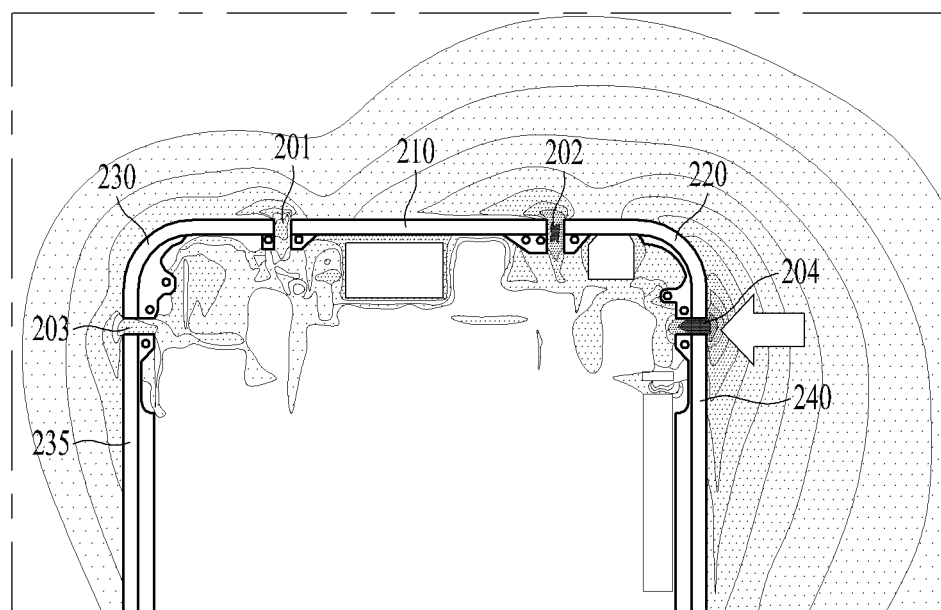
Figure 4:
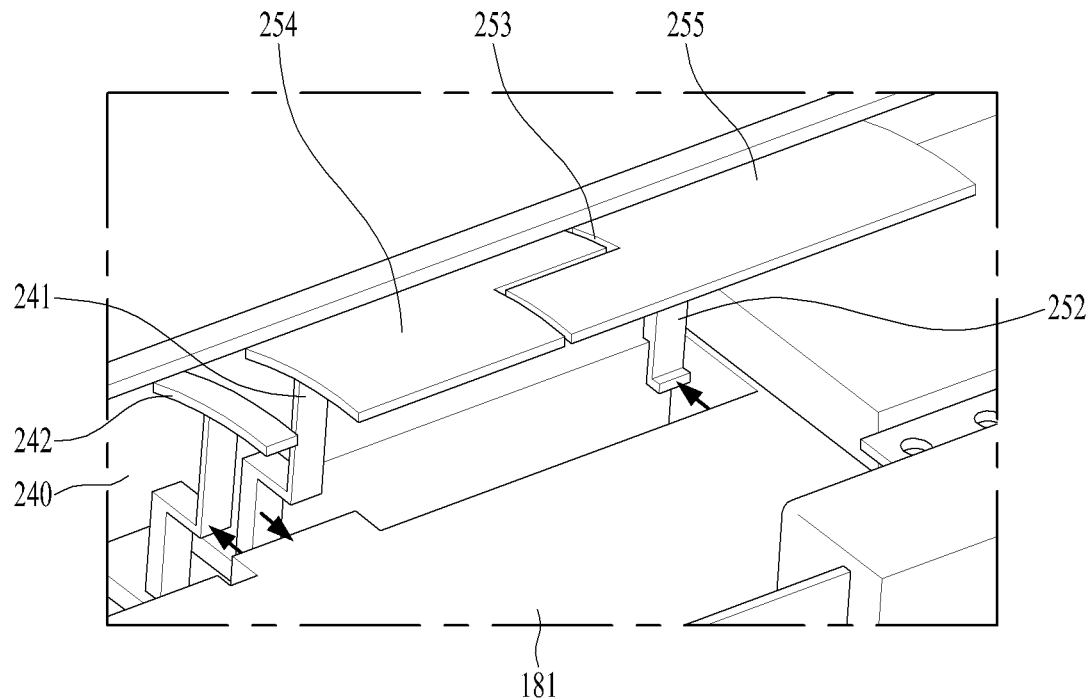
FIG. 4 is a perspective view and a conceptual view showing a second antenna of a mobile terminal according to an embodiment of the present disclosure.
Figure 4:
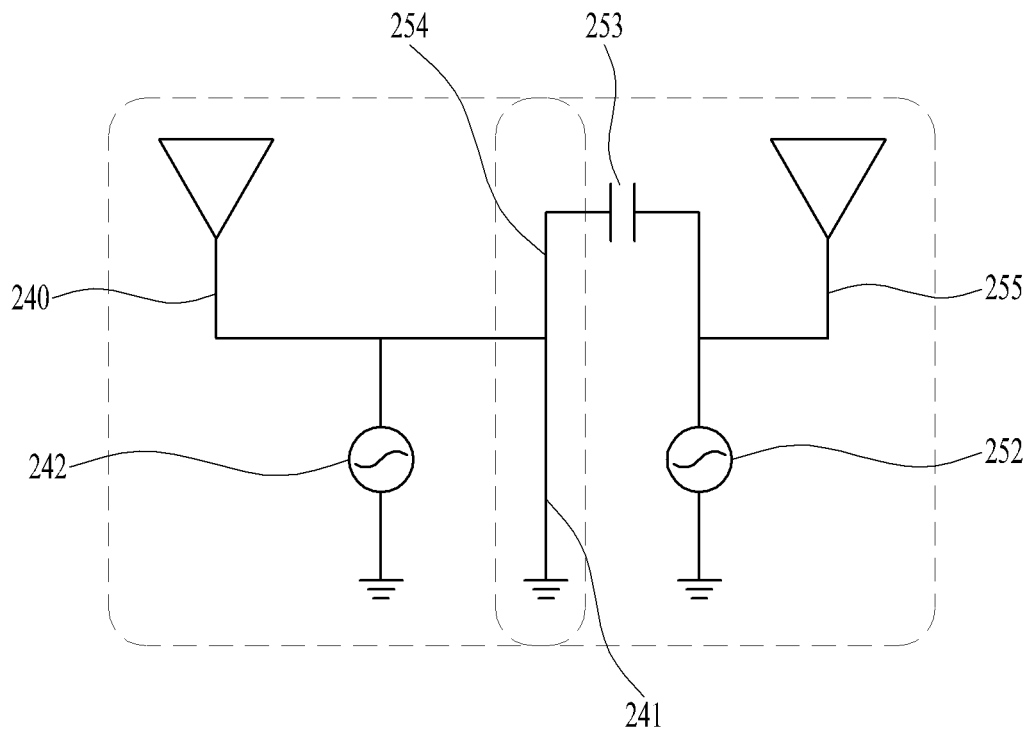

FIG. 3 is a diagram for explaining the operation and performance of the first antenna 240 of the mobile terminal 100 according to an embodiment of the present disclosure. FIG. 4 is a diagram for explaining the operation of the second antenna 240 of the mobile terminal 100 and the electric field distribution according to an embodiment of the present disclosure. The first antenna 240 in accordance with the present disclosure has an open first end near the slit 204. The second end thereof is connected to the middle frame 290 and thus is grounded.

A third antenna adjacent to the second antenna 250 has a portion adjacent to the second antenna 250 and connected to the middle frame 290 via the ground line 241. Thus, the mutual interference between the third antenna and the second antenna 250 may be minimized such that the effect of the adjacent third antenna on the second antenna 250 may be reduced.

The second end of the first antenna 240 is connected to the middle frame 290. Thus, the portion thereof connected to the middle frame 290 may serve as a ground line 241. In another example, an additional ground line 241 may be provided. In this case, the position of the feeding line 242 near the first end determines the resonance frequency of the first antenna 240.

The feeding line 222 disposed adjacent to the ground line 241 is further included. A current flows from the ground line 241 along the first antenna 240. As shown in FIG. 3B, the radiation mainly occurs through the slit 204 and the intensity of the electric field at the slit 204 is the greatest.

However, as described above, because of the limitation of the mounting space of the antenna, the spacing between the antennas may not be large. Thus, as shown in FIG. 2, the first antenna 240 and the second antenna 250 are disposed adjacent to each other.

Even when the antennas transmitting and receiving signals at different frequency bands are disposed adjacent to each other, there is interference between them. The mutual interference between a plurality of antennas operating in the same frequency band may be more severe. Therefore, it is not easy to construct the antennas for transmitting and receiving signals at the same frequency band in the mobile terminal 100 having a small size.

To solve the problem, according to the present disclosure, the second antenna 250 operating at the same frequency as that of the first antenna 240 may have an additional radiator sharing the ground line 241 to avoid mutual interference.

FIG. 4 is a diagram illustrating a first antenna 240 of a mobile terminal 100 according to an embodiment of the present disclosure, wherein (a) is a perspective view thereof and (b) is a conceptual view schematically showing the first antenna 240 and second antenna 250. An end of the second antenna 250 is overlapped in the thickness direction with the slot formed by the first antenna 240 and the middle frame 290 and is spaced from the slot in the backward direction. The second antenna 250 may be located on the inner surface of the rear case 102 located on the rear surface of the middle frame 290.

The second antenna 250 is composed of two patterns as shown in FIG. 4A. A first pattern 254 and second pattern 2545 may be formed. A gap 253 as a separation space between first pattern and 254 second pattern 255 may be defined. The ground line 241 shared between the second antenna 250 and the first antenna 240 is connected to the first pattern 254 and the feeding line 252 is connected to the second pattern 255.

An end of the second antenna 250 is disposed in a superposed manner with the slot formed by the first antenna 240 and the middle frame 290 in the thickness direction of the mobile terminal 100. That is, the second antenna 250 is spaced apart from the first antenna 240 in the back direction of the mobile terminal 100. The second antenna 250 may be located on the inner face of the rear case 102 located on the back face of the middle frame 290. The second antenna 250 may be realized by injecting the second antenna 250 to the inner face of the rear case 102 or by attaching the patterns thereto.

As shown in FIG. 4(b), the gap 253 serves as a capacitor. Thus, it is possible to reduce the interference between the first antenna 240 and the second antenna 250 by using the characteristic that the charges are gathered around the gap. The left portion of FIG. 4(b) is the first antenna 240 and the right portion thereof is the second antenna 250. The first antenna 240 and the second antenna 250 have feeding lines 242 and 252 respectively, while the ground line 241 is shared therebetween.

Figure 5:
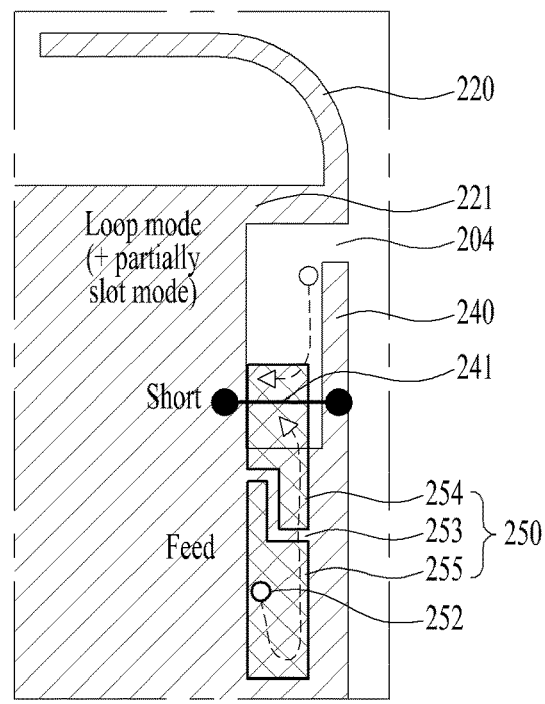
FIG. 5 is a view for explaining the operation and performance of a second antenna of a mobile terminal according to an embodiment of the present disclosure.
Figure 5:
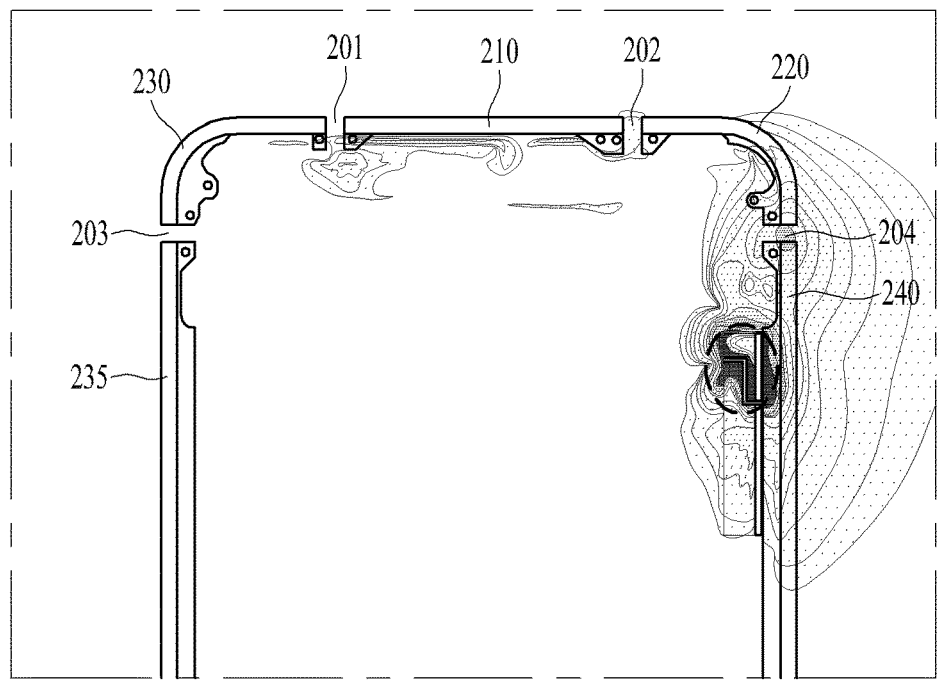

FIG. 5 is a view for explaining the operation of the second antenna 250 of the mobile terminal 100 and the distribution of the electric field according to an embodiment of the present disclosure. (a) is a diagram showing a current flow when power is applied to the feeding line 252 of the second antenna 250. (b) shows an electromagnetic field generated when power is applied to the feeding line 252 of the second antenna 250.

Even though the first pattern 254 and the second pattern 255 are not connected to each other, a current may flow therebetween after the gap 253 has been charged like a capacitor. The current flows to the second pattern 255 from the first pattern 254 while looping along the second antenna 250. As described above, the slot formed by the first antenna 240 overlaps the second antenna 250, and the first antenna 240 and second antenna 250 share the ground line 241. Thus, the current flows through a fourth antenna radiator 240 due to the current flowing in the second antenna 250. Thus, the radiator may partially operate as a slot antenna.

As shown in FIG. 5(b), the largest electric field is generated around the gap 253 because a large number of charges accumulate around the gap 253. As shown in FIG. 5(b), when the first antenna 240 operates, a location from which the main radiation occurs (that is, the location where the largest electric field is generated) is the slit 204 adjacent to the first end of the first antenna 240. As shown in FIG. 5(b), when the second antenna 250 operates, a location from which the main radiation occurs (that is, the location where the largest electric field is generated) is the gap 253 in the second antenna 250. Thus, the locations from which the main radiation occurs (that is, the location where the largest electric field is generated) when the first antenna 240 and second antenna 250 operate may be different from each other. Thus, interference between the first antenna 240 and the second antenna 250 may be reduced.

The second antenna 250 overlaps with the middle frame 290 as the ground, when viewed from the rear. When the middle frame 290 is overlapped with the second antenna 250, the charges may be caught by the middle frame 290, such that the radiation performance may be deteriorated. However, the first antenna 240 and second antenna 250 may share the ground line 241 such that, with the help of the first antenna 240, the radiation from the second antenna 250 may occur as shown in FIG. 5b.

The capacitance of the capacitor, that is, the amount of the charge collected in the capacitor is determined by the distance between the two conductors and the area of each of the opposite conductors. Thus, as shown in FIGS. 4(a) and 5(a), the gap may be formed in a bent shape instead of a straight line, so that the entire length of the gap may be made larger. The larger the amount of the charges accumulated in the gap, the more radiation from the gap may occur. The isolation between the second antenna and the first antenna may be larger.

Figure 6:
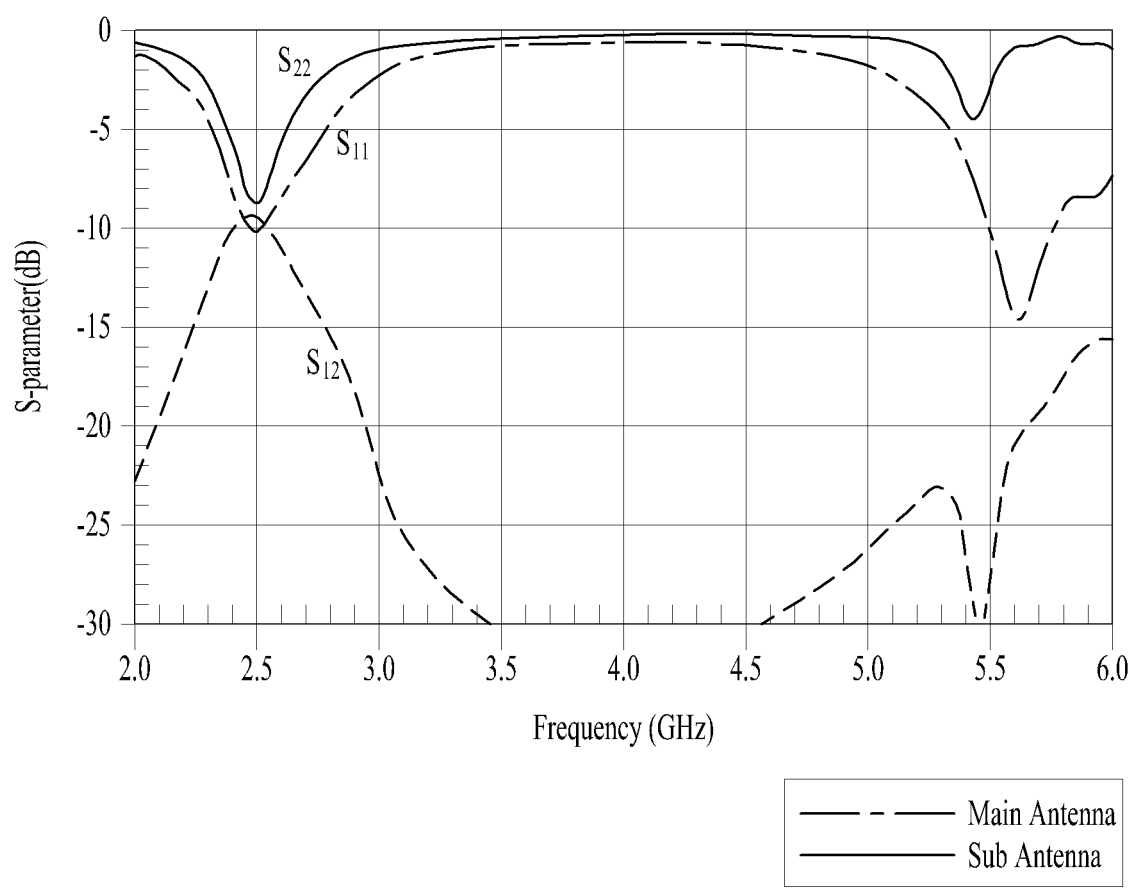
FIG. 6 is a graph illustrating a mutual interference between a first antenna and a second antenna of a mobile terminal according to an embodiment of the present disclosure.

FIG. 6 is a graph illustrating a mutual interference between the first antenna 240 and the second antenna 250 of a mobile terminal according to an embodiment of the present disclosure. Both of the first antenna 240 and second antenna 250 resonate at 2.5 GHz and 5 GHz. The graph has peaks and valley corresponding thereto. However, since the first antenna 240 and the second antenna 250 are arranged close to each other, $S_{12}$ which represents the transfer coefficient at the point corresponding to the resonance frequency becomes larger at the resonance frequency, thereby degrading the performance of the first antenna 240 and the second antenna 250.

In general, when the first antenna 240 and the second antenna 250 transmitting and receiving signals at the same frequency are disposed adjacent to each other, the transfer coefficient is greater than −5 dB. In this embodiment, the transfer coefficient is about −9 dB at 2.5 GHz and is lower than −9 dB at 5 GHz, so that the influence between the first antenna 240 and the second antenna 250 is substantially negligible. Thus, forming the gap in the second antenna 250 to change the radiation position as described above may reduce the reflection coefficient.

Figure 7:
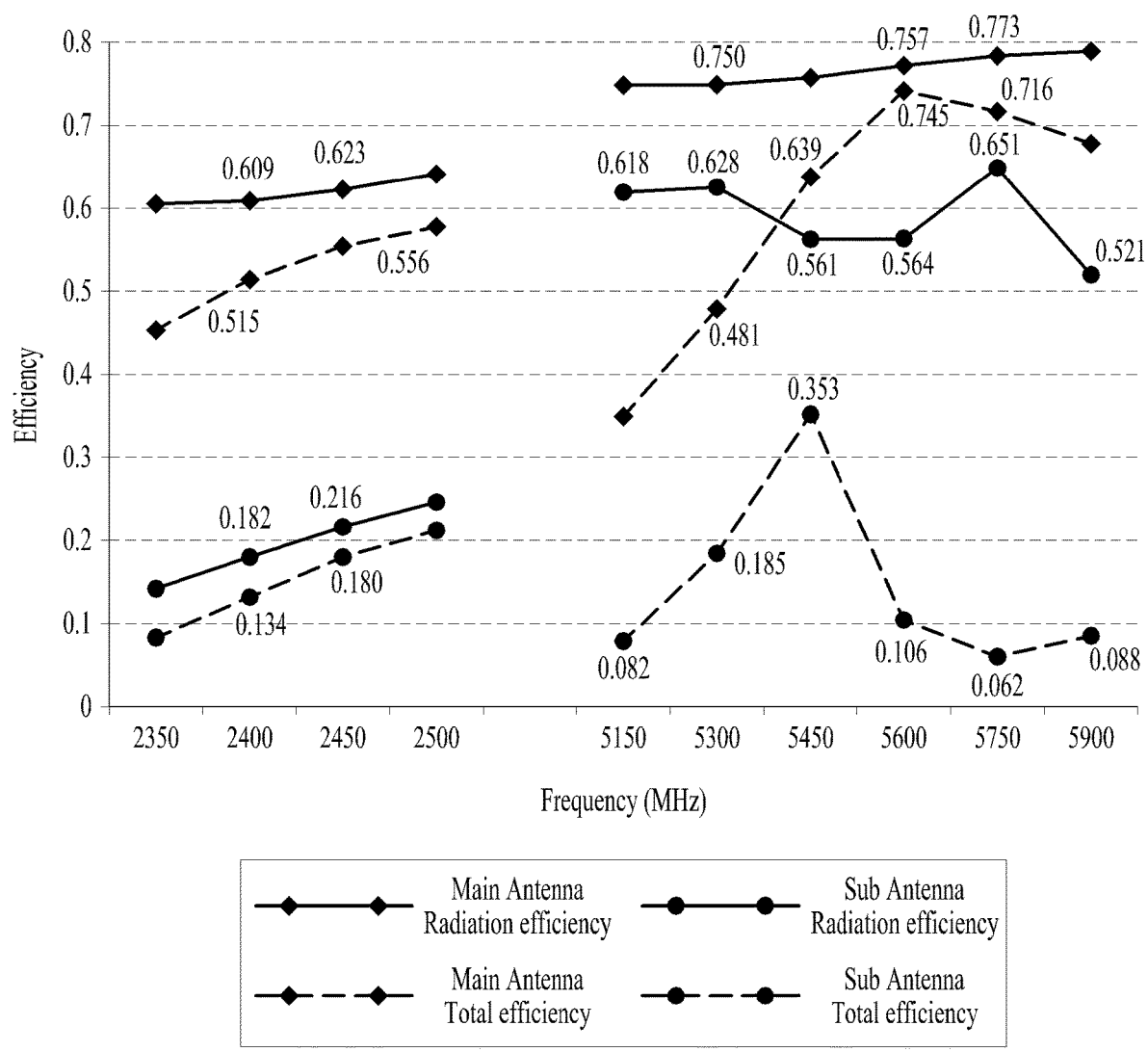
FIG. 7 is a graph illustrating efficiency of a first antenna and a second antenna of a mobile terminal according to an embodiment of the present disclosure.

FIG. 7 is a graph illustrating wireless communication efficiency of the first antenna 240 and the second antenna 250 of the mobile terminal according to an embodiment of the present disclosure. The solid line is a graph showing the theoretical radiation efficiency when the impedances of the antennas match with each other (in the ideal state), that is, the reflection coefficients $S_{11}$ and $S_{22}$ are −∞. The dotted line represents the performance of the actually designed antennas. When implementing the actually designed antennas, the impedance matching is not perfect. Thus, the total efficiency is lower than the theoretical value.

As shown in FIG. 6, in the 2.5 GHz band, the first antenna 240 and the second antenna 250 both have the resonance frequency correctly located at 2.5 GHz, such that the impedance matching therebetween occurs. Thus, the actual efficiency is not much lower than the theoretical efficiency.

As described above, the mobile terminal 100 according to the present disclosure may increase the data transmission rate by having the increased number of Wi-Fi antennas.

Further, antenna performance can be improved by minimizing interference between the antennas transmitting and receiving signals at the same frequency. Thus, even when the size of the display unit is large, the performance of the antennas can be secured and the size of the top bezel of the display unit can be reduced.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A mobile terminal comprising:
a case for receiving an electronic component therein;
a middle frame mounted on the case;
a first antenna spaced apart from and parallel with the middle frame, wherein the first antenna has an open first end and a second end connected to the middle frame;
a first feeding line connected to the first antenna to transmit a signal thereto;
a ground line connected to the first antenna to ground the first antenna;
a second antenna connected to the ground line; and
a second feeding line connected to the second antenna, wherein the second antenna includes:
a first pattern connected to the ground line; and
a second pattern connected to the second feeding line, wherein a gap is defined between the first pattern and the second pattern.

2. The mobile terminal of claim 1, wherein the first antenna extends in a first direction, and
wherein the first pattern and the second pattern are arranged in the first direction.

3. The mobile terminal of claim 1, wherein the first end of the first antenna and the gap of the second antenna are not overlapped with each other.

4. The mobile terminal of claim 1, wherein the gap of the second antenna extends in a bent shape.

5. The mobile terminal of claim 1, wherein at least a portion of the second antenna is overlapped with a space between the first antenna and the middle frame.

6. The mobile terminal of claim 1, wherein at least a portion of the second antenna is overlapped with the middle frame and is located on a back face of the case.

7. The mobile terminal of claim 1, wherein the case includes a side case, and
wherein the first antenna defines a portion of the side case exposed to an outside.

8. The mobile terminal of claim 1, wherein the case includes a rear case made of nonmetallic material, and
wherein the second antenna includes a conductive pattern attached to the rear case.

9. A mobile terminal comprising:
a case for receiving an electronic component therein;
a middle frame mounted on the case;
a first antenna disposed on one side of the middle frame and parallel with the middle frame, wherein the first antenna has one end connected to the middle frame and the other end being open such that an opened slot is defined between the middle frame and the other end of the first antenna; and
a second antenna having one side overlapped with the slot and the other side overlapped with the middle frame, wherein the second antenna has a gap defined in a portion thereof overlapped with the middle frame.

10. The mobile terminal of claim 9, further comprising:
a first feeding line connected to the first antenna to transmit a signal thereto;
a ground line connected to both of the first antenna and the second antenna; and
a second feeding line connected to the second antenna to transmit a signal thereto,
wherein the gap is located between a location at which the ground line is connected to the second antenna and a location at which the second feeding line is connected to the second antenna.

\* \* \* \* \*